(12) United States Patent
Bousfield, III et al.

(10) Patent No.: US 7,428,158 B2
(45) Date of Patent: Sep. 23, 2008

(54) SYSTEM AND METHOD FOR REDUCING HARMONIC EFFECTS ON A POWER DELIVERY SYSTEM

(75) Inventors: John Channing Bousfield, III, Murrysville, PA (US); Richard H. Osman, Pittsburgh, PA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 271 days.

(21) Appl. No.: 11/518,979

(22) Filed: Sep. 11, 2006

(65) Prior Publication Data

US 2007/0058405 A1    Mar. 15, 2007

Related U.S. Application Data

(60) Provisional application No. 60/715,781, filed on Sep. 9, 2005.

(51) Int. Cl.
*H02M 5/458* (2006.01)
*H02M 1/12* (2006.01)

(52) U.S. Cl. .......................................... 363/65; 363/39
(58) Field of Classification Search ................. 363/34, 363/35, 36, 37, 39, 40, 44, 65, 67, 69, 71
See application file for complete search history.

(56) References Cited

U.S. PATENT DOCUMENTS 5,625,545 A * 4/1997 Hammond ................... 363/71
5,638,263 A   6/1997 Opal et al.
5,933,339 A * 8/1999 Duba et al. .................... 363/71
6,236,580 B1 * 5/2001 Aiello et al. .................. 363/37
6,301,130 B1   10/2001 Aiello et al.
6,313,600 B1   11/2001 Hammond et al.
6,411,530 B2   6/2002 Hammond et al.
6,762,947 B2   7/2004 Hammond

OTHER PUBLICATIONS

J.W. Dixon et al., "Dynamically Stabilized Indirect Current Controlled SPWM Boost Type 3-Phase Rectifier", IEEE, 1988, pp. 700-705.
T. Kohara et al., "Carrier Phase Error Detection Method and Synchronization Control of Parallel-Connected PWM Inverters without Signal Line", IEEJ Trans. IA, vol. 124, No. 5, 2004, pp. 450-456.
Z.H. Wang, et al., "A Novel PWM scheme to eliminate common-mode voltages in cascaded multi-level inverters", IEEE, 2003, pp. 780-785.

* cited by examiner

*Primary Examiner*—Gary L Laxton (57) ABSTRACT

A power delivery system, and a method for operating it includes a plurality of power cells that are electrically connected to a multi-winding machine comprising one or more primary windings and a plurality of secondary windings such that each cell is electrically connected to one of the secondary windings and a plurality of the secondary windings are phase-shifted with respect to the primary windings. The method includes determining, for each cell in a set of the power cells, a carrier offset angle, and synchronizing, by the each cell in the set, a carrier signal to the secondary voltage for the cell based on the carrier offset angle determined for the cell. The carrier signal for each cell controls the timing of operation of switching devices within the cell.

24 Claims, 8 Drawing Sheets

SYSTEM AND METHOD FOR REDUCING HARMONIC EFFECTS ON A POWER DELIVERY SYSTEM

CROSS-REFERENCE TO RELATED APPLICATIONS

This patent application claims priority to, and incorporates by reference in its entirety, pending U.S. Provisional Patent Application No. 60/715,781, entitled "System and method to minimize harmonics for active controlled AC-AC power supply," filed Sep. 9, 2005.

STATEMENT REGARDING FEDERALLY SPONSORED RESEARCH

Not applicable.

NAMES OF PARTIES TO A JOINT RESEARCH AGREEMENT

Not applicable.

INCORPORATION BY REFERENCE OF MATERIAL ON DISK

Not applicable.

BACKGROUND

A power supply to control the flow of energy between a first alternating current (AC) system and a second AC system is required in a variety of commercial and industrial applications, such as the control of AC motor operation. Some such power supplies convert the energy from a first frequency and voltage to a second frequency and voltage. One way to implement such a system is with a drive containing one or more power cells that include two solid state converters with an intermediate direct current (DC) link. A power cell is an electrical device that has a three-phase alternating current input and a single-phase alternating current output. One such system is described in U.S. Pat. No. 5,625,545 to Hammond, the disclosure of which is incorporated herein by reference in its entirety.

Figure 1:
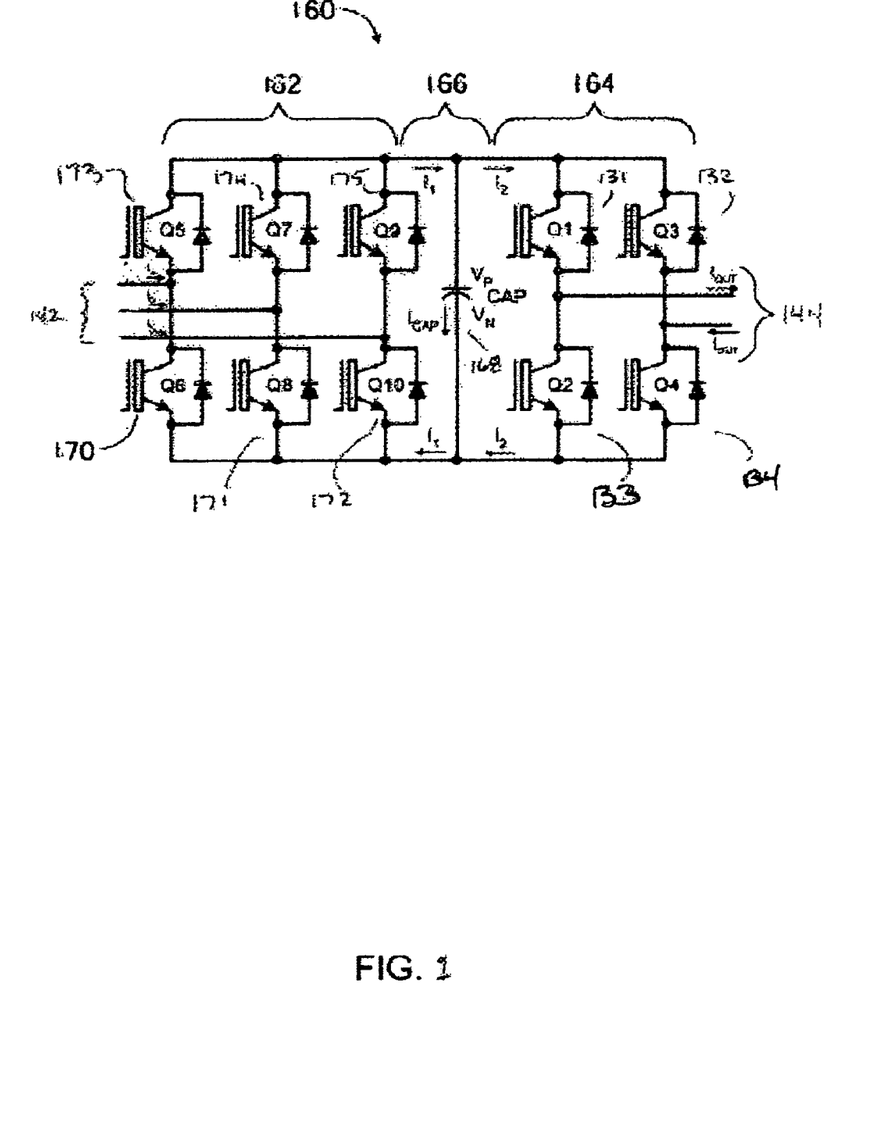
FIG. 1 is a circuit diagram showing exemplary characteristics of a power cell having bidirectional switching devices.

Power cells may be either non-regenerative or regenerative. Non-regenerative power cells can drive a motor but cannot control the flow of current to brake a motor by absorbing regenerative power. Regenerative power cells have the capability of absorbing regenerative power and optionally returning it to the source, thus, allowing the cell to participating in braking the motor. Recently, power cells have been developed that use switching devices, such as insulated gate bipolar transistors (IGBTs) to allow the cell to assist in both driving and braking a motor. For example, referring to FIG. 1 herein, a power cell 160 includes an active front end 162 that serves as a three-phase bridge as it receives power from dedicated three-phase secondary windings of the transformer via an input 142. The cell 160 also includes a plurality of input switches 170-175, which may be bidirectional current-controlling devices such as IGBTs or other transistors, thyristors, or other switching devices. Although six transistors in a bridge format—in this example, three pairs of two transistors each connected in parallel across the DC terminals—are illustrated in FIG. 1, other numbers and types of input switches may be used. The input switches control the DC bus voltage in the cell. A DC filter section 166 includes one or more capacitors 168. The remainder of the cell may include an output stage 164 such as an H-bridge inverter made up of four output switches 131-134, each connected across the output or DC terminals of the active front end 162 and the DC filter 166, to deliver AC power to the output 144.

A circuit including power cells such as 160 in FIG. 1, when connected to a load such as a motor, can provide power from an input source to the motor when operating in the motoring mode. When input converter sections 162 such as those shown in FIG. 1 are used, drive switching events can product harmonic currents. Harmonic currents may also be produced when a single-phase inverter section is connected to a motor. The harmonics can be compounded when multiple cells have switches that operate at the same time.

U.S. Pat. No. 5,625,545 discloses that a multi-winding transformer may be used to reduce harmonic currents created by a unidirectional, or non-regenerative, power cell. However, this method may not always reduce harmonics in regenerative power cells to a desired level. Other methods, such as using a master clock to generate synchronized carriers and applying the carriers to multiple converters connected to a transformer having non-phase shifted secondary windings, have not been entirely effective, and many increase drive complexity and cost.

The disclosure contained herein describes attempts to reduce harmonics created by operating a power cell having bidirectional switching devices.

SUMMARY

In an embodiment, a method of controlling a power delivery system includes operating a system comprising a plurality of power cells that are electrically connected to a first transformer comprising one or more primary windings and a plurality of secondary windings such that each cell is electrically connected to one of the secondary windings and a plurality of the secondary windings are phase-shifted with respect to the primary windings. Each cell includes a plurality of switching devices. The method may include controlling the timing of activation of the switching devices within each cell so that an effective frequency of the activation for all of the cells as reflected to the primary is at least three times greater than the switching frequency of any individual cell. The controlling may not require the use of a synchronizing clock signal in some embodiments. For example, the controlling may include determining a carrier offset angle, passing the carrier offset angle to the first power cell, and synchronizing, by the first power cell, a carrier signal to the first secondary voltage based on the carrier offset angle. The method of also may include synchronizing, by each additional cell in the system, an additional carrier signal to a secondary voltage for each additional cell. The carrier signals for each cell may be interdigitated so that they are distributed substantially evenly when reflected toward the primary windings of the source transformer. The carrier signal also may control the timing of implementation of commands that control the switching devices, such as switching devices that are part of an AC-to-DC converter portion of the cell. When a plurality of the cells determine that switching commands must be implemented, the carrier offset angle for each cell may ensure that the commands are effectively interdigitated as reflected to the primary of the transformer. A command may be implemented by the first power cell at a frequency substantially equal to a multiple of a fundamental frequency. The carrier offset angle may represent a phase relationship between the carrier signal of the first cell and the first secondary voltage.

Optionally, the method also may include operating a second system comprising a second transformer and a second plurality of power cells, wherein the second transformer comprises one or more primary windings and a plurality of secondary windings, the primary windings of the second transformer are electrically connected to the primary windings of the source transformer at a common point, and each power cell in the second system generates a carrier signal. The carrier signals for each cell in the second system may be interdigitated so that they are distributed substantially evenly when reflected toward the primary windings of the secondary transformer.

In an alternate embodiment, a method for operating a power delivery system includes operating a system comprising a plurality of power cells that are electrically connected to a first transformer comprising one or more primary windings and a plurality of secondary windings such that each cell is electrically connected to one of the secondary windings and a plurality of the secondary windings are phase-shifted with respect to the primary windings. Each cell includes a plurality of switching devices. A first secondary winding is electrically connected to deliver power to a first power cell. The method may include determining a carrier offset angle, passing the first carrier offset angle to the first power cell, and synchronizing, by the first power cell, a carrier signal to the first secondary voltage based on the first carrier offset angle. The method also may include, for a second cell that is connected to a second secondary winding of the source transformer, wherein the second secondary winding has a voltage that is phase-shifted with respect the voltage of the first secondary winding, synchronizing a second carrier signal to the second secondary voltage using a second carrier offset angle. The carrier signals for each cell that is electrically connected to the source transformer may be interdigitated so that they are distributed substantially evenly when reflected toward the primary windings of the source transformer. The carrier signals also control the timing of implementation of commands that control the switching devices, and the synchronizing controls the timing of activation of the switching devices within each cell so that an effective frequency of the activation for all of the cells as reflected to the primary is at least three times greater than the switching frequency of any individual cell. The switching devices may be part of an AC-to-DC converter portion of the cell. When multiple cells determine that switching commands must be implemented, the commands may be effectively interdigitated as reflected to the primary of the transformer. A command may be implemented by the first power cell at a frequency substantially equal to a multiple of a fundamental frequency. The carrier offset angle may represent a phase relationship between the carrier signal of the first cell and the first secondary voltage.

In alternate embodiment, a method of operating a power delivery system, includes operating a system comprising a plurality of power cells that are electrically connected to a multi-winding machine comprising one or more primary windings and a plurality of secondary windings such that each cell is electrically connected to one of the secondary windings and a plurality of the secondary windings are phase-shifted with respect to the primary windings. The method includes determining, for each cell in a set of the power cells, a carrier offset angle, and synchronizing, by the each cell in the set, a carrier signal to the secondary voltage for the cell based on the carrier offset angle determined for the cell. The carrier signal for each cell controls the timing of operation of switching devices within the cell. A switching frequency for all of the cells may be at least three times greater than a switching frequency for any individual cell's carrier signal.

DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. Further, the word "comprising" means "including but not limited to." Unless defined otherwise, all technical and scientific terms used herein have the same meanings as commonly understood by one of ordinary skill in the art.

Figure 2:
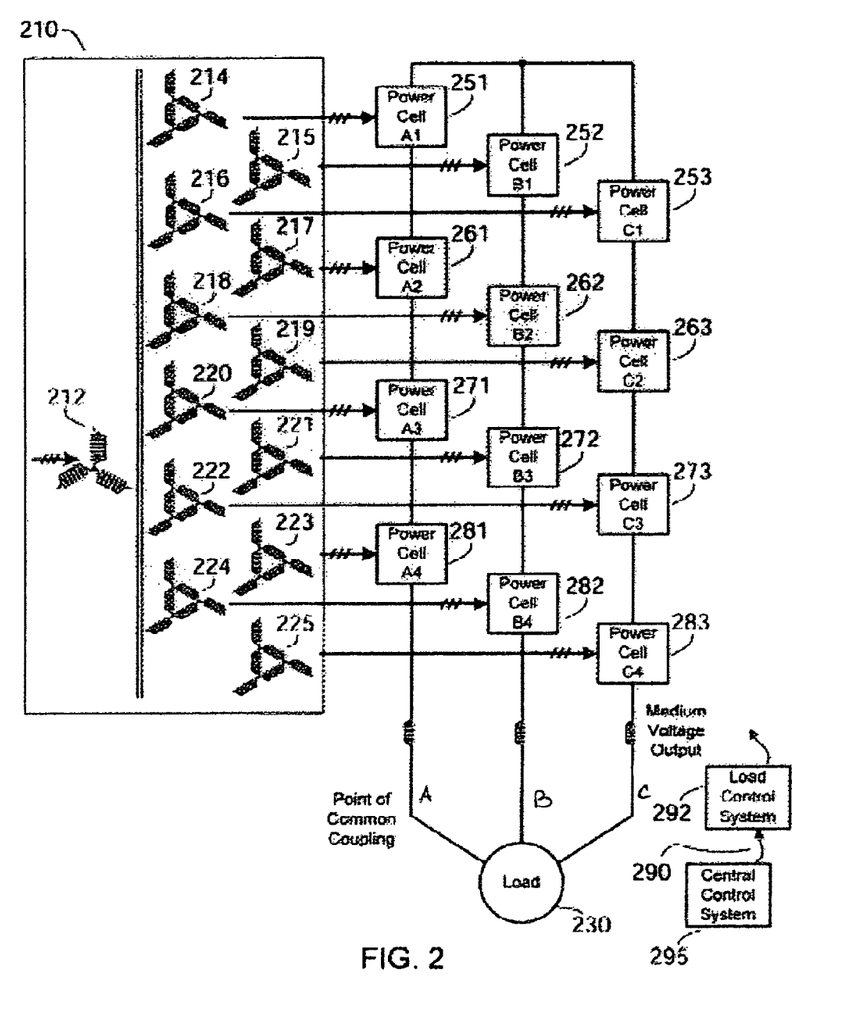
FIG. 2 depicts a circuit comprising a plurality of power cells connected to a load.

In various embodiments, a multi-level power circuit includes a plurality of power cells to drive a load. FIG. 2 illustrates an exemplary embodiment of a circuit having such power cells. In FIG. 2, a multi-winding machine such as a source or input transformer 210 delivers three-phase, medium-voltage power to a load 230 such as a three-phase induction motor via an array of single-phase inverters (also referred to as power cells). As used herein, the term "transformer" is intended to include any multi-winding machine that is normally on the supply side of the system. The transformer 210 includes primary windings 212 that excite a number of secondary windings 214-225. Although primary winding 212 is illustrated as having a star configuration, a mesh configuration is also possible. Further, although secondary windings 214-225 are illustrated as having a mesh configuration, star-configured secondary windings are possible, or a combination of star and mesh windings may be used. Further, the number of secondary windings illustrated in FIG. 2 is merely exemplary, and other numbers of secondary windings are possible. The circuit may be used for medium voltage applications or, in some embodiments, other applications. As used herein, medium voltage means a rated voltage greater than 690 volts (V) and less than 69 kilovolts (kV). In some embodiments, medium voltage may include voltages between about 1000 V and about 69 kV. In the embodiments described herein, each secondary winding is phase-shifted from the primary and other secondary windings by a predetermined amount based on the configuration of the windings. Exemplary phase shift angles may be about 0°, +30°, 0°, and −30°. Other phase shifts are possible.

Any number of three-phase sets of power cells may be connected between the transformer 210 and the load 230. The power cells may include cells such as those having a configuration of that shown in FIG. 1, or the power cells may include cells having one or more other configurations. Referring to FIG. 2, the system may include a first set or "rank" of power cells 251-253 across the three phases of the load, a second rank of power cells 261-263, a third rank of power cells 271-273, and a fourth rank of power cells 281-283. Fewer than four sets or ranks, or more than four sets or ranks, are possible. A central control system 295 sends command signals to a local controller 292 and/or cell-level controls in each cell over fiber optics or another wired or wireless communications medium 290.

Referring to both FIGS. 1 and 2, direct current is delivered to the DC filter 166, and alternating current is delivered to the output 144 of a cell, based on controlling signals that the transistors 131-134 and 170-175 receive from local modulation controller 292. Controller 292 selects which transistors will be OFF or ON, thus modulating the power that is delivered to the output 144. Optionally, communications circuits such as fiber-optic modulator control links 290 can be used to electrically isolate all circuits in any one cell from all circuits in any other cell, and to reduce electromagnetic interference effects which may be imposed between local controller 292 and master modulation controller 295. Local modulation controller 292 can receive power from a local control power source which may be electrically connected to the secondary winding circuit input.

Figure 3:
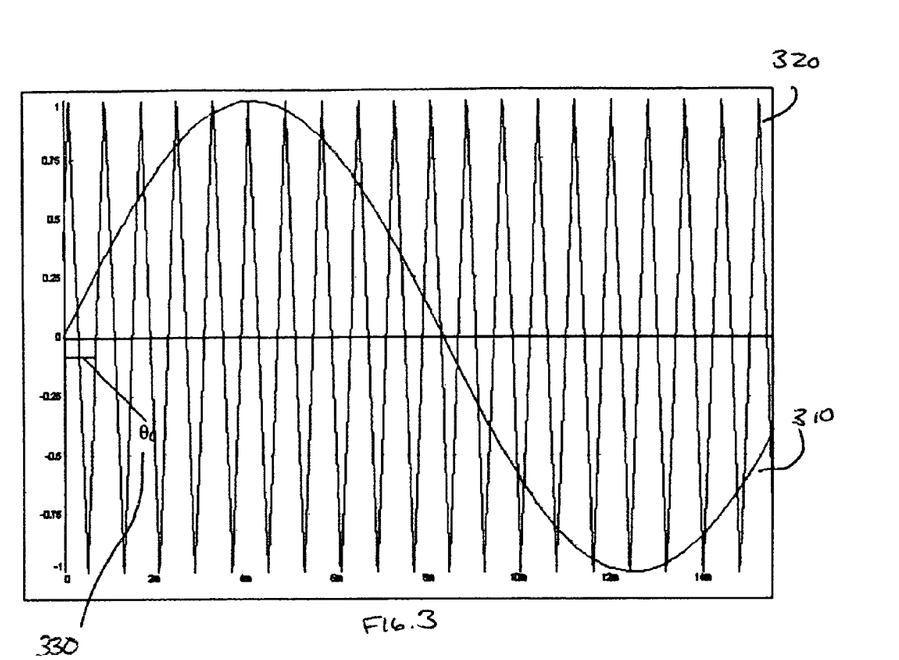
FIG. 3 illustrates an exemplary control signal and carrier signal for controlling a power cell.

FIG. 3 shows one possible way of using a carrier signal to control a power cell such as the AC/DC power conversion apparatus described herein. In general, a control signal can be generated for each power output line. Further, each cell may include circuitry that generates a carrier signal, such as, for example, a triangular signal, having a fixed phase relationship to the voltage that the carrier receives from its electrically connected transformer secondary winding. Referring to FIG. 2 in the architecture of this example, each power output line, A, B, C, has four serially-connected power cells, for example, A1, A2, A3, and A4. The output of each power cell can be summed to produce a composite power output line signal. In addition, the composite power output line signals for each of power output lines A, B, C, respectively, can be summed to produce a composite total output signal which can be supplied to the load.

In FIG. 3, a control signal 310 for a power output line oscillates at a frequency equal to or substantially equal to the fundamental frequency of the transformer primary, such as 50 hertz (Hz) or 60 Hz for example. Control signal 310 is compared with a triangular carrier signal, shown at 320, oscillating at the preselected switching frequency such as, for example, 1 kilohertz (kHz). A carrier signal 320 is a triangular shaped waveform having a frequency that is a multiple, and preferably an odd integer multiple, of the fundamental frequency of the control 310. The carrier signal controls when commands are operated by power cell, and thus the carrier signal controls switching of the devices within each cell. For example, each time that the carrier signal 320 and control signal 310 intersect, a command to operate one or more switching devices within the cell may be operated. Referring to FIG. 1, the switching devices that are operated by the commands may be devices 170-175 such as those in the active front end 162 (i.e., AC-to-DC converter portion) of the cell. The actual command (i.e., the switches selected for operation) may depend on the voltage delivered from the source transformer, signals received from the control system, and/or other factors.

Figure 5:
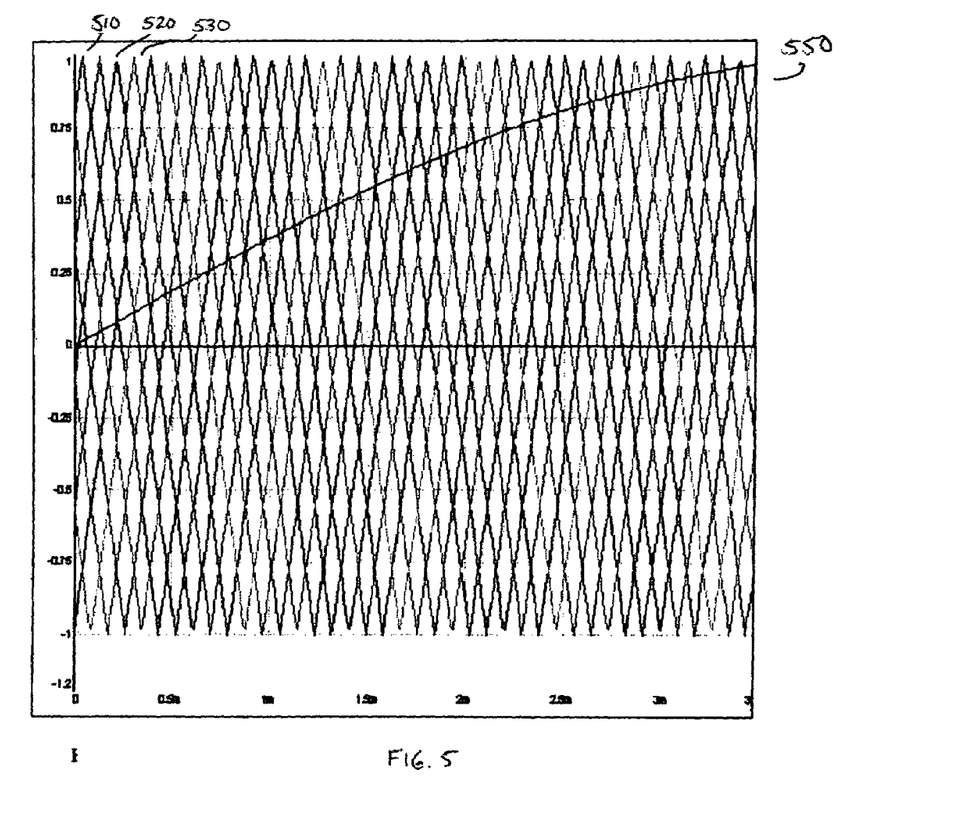
FIG. 5 is an illustration of an exemplary carrier signal distribution as reflected to a transformer primary.

Each carrier signal within a power cell is phase-shifted by a certain amount with respect to both its corresponding transformer secondary and the other carrier signals for the other power cells in the system. The phase shift may be dependent on the number of cells in the drive, the position of the cell in the drive, and the relative phase shift between the corresponding secondary winding voltage and the primary voltage. The phase shift of each carrier signal permits the interdigitation of carrier signals when viewed from the primary side of the source transformer, as can be seen in, for example, FIG. 5, which shows multiple interdigitated carrier signals, including 510, 520 and 530, as reflected to the primary winding of the source transformer. As seen in FIG. 5, the signals are substantially evenly distributed so that no to signals overlap and the distance between peaks is substantially consistent across all of the carrier signals.

A result of such phase shifting may be that the effective switching frequency component on the primary windings of the source transformer will be increased by at least three times $f_c$ (i.e., where synchronization is done for at least three cells in the system), up to around $N*f_c$, where N is the number of power cells and $f_c$ is the carrier frequency within an individual cell. In general, each cell's carrier signal will have substantially the same carrier frequency as the other cells' carrier signals.

Figure 4:
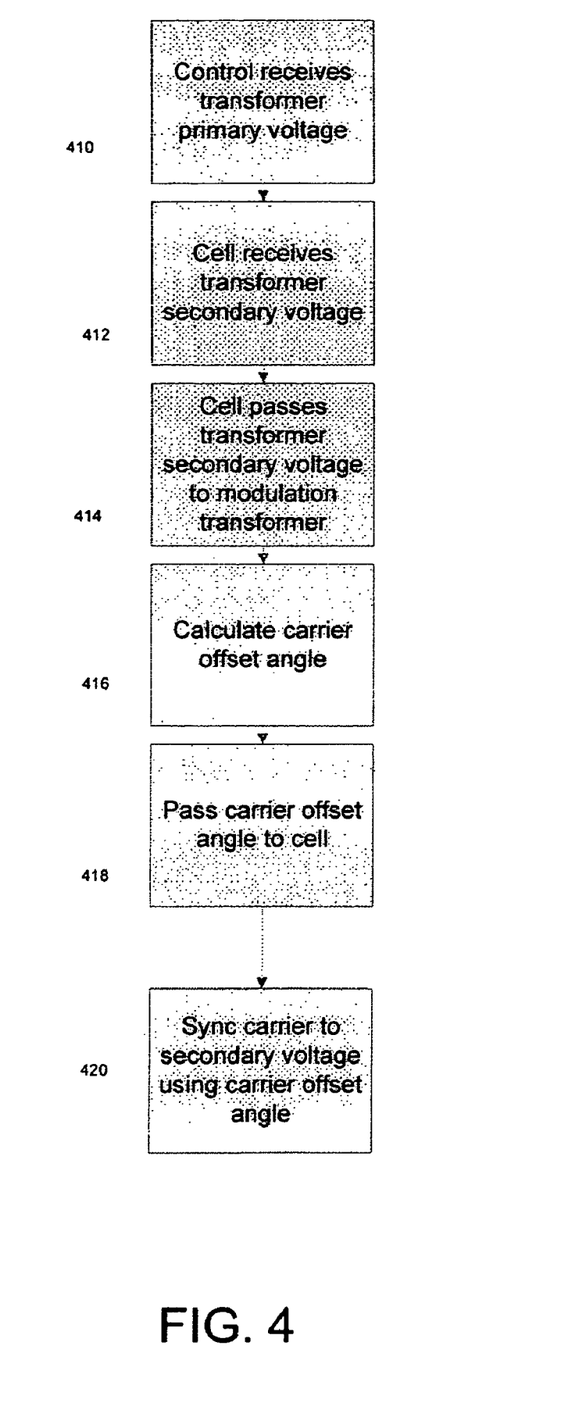
FIG. 4 is a process flow diagram describing an exemplary cell voltage phase angle synchronization method.

Referring to FIG. 4, in a method for reducing current harmonics a local modulation controller or other device may monitor or receive 410 the input source primary voltage (i.e., the transformer primary winding voltage). As indicated in FIG. 2, each cell 251-283 is electrically connected to a secondary winding 214-225 of the source transformer 210. Returning to FIG. 4, the cells monitor or receive 412 the secondary voltage and pass 414 the voltage to the local modulation controller, where the control calculates a carrier offset angle 416 using the transformer primary phase data, transformer secondary phase data for the cell, the number of cells in the drive, and a drive carrier offset parameter. Any suitable method of determining a phase shift between cell carrier signals for a power circuit or drive having a multi-winding transformer with phase-shifted secondary windings may be used.

As noted above, and as illustrated in FIG. 2, a carrier 320 is a triangular shaped waveform with a frequency that is an integer multiple of the frequency of the fundamental 310. In some embodiments, the carrier for each power cell can be described as having been constructed from the formula 2*arc-sine(sine($2_C+2_{C0}$))/B, and a phase shift value $2_o$ (330 in FIG. 3) represents a value for each cell that will interdigitate the carriers for all cells in the system, such as is illustrated in FIG. 5. The values listed above can be further understood by considering:

$T_c = H_N \cdot T_f$ This is the frequency of the carrier which is locked by a phase-locked loop within the cell to an integer multiple of the fundamental frequency and a predetermined phase angle $2_{C0}$.

$2_C = \int T_{cdt}$ This is the angle of the carrier as a function of time.

$2_{C0} = 2_{CR} + H_N \cdot 2_0$ This is the carrier reference angle adjusted by another angle, $2_0$, such that the carrier when reflected to the primary of the transformer is interdigitated among the carriers of the other cells.

$2_0 = (2_v \cdot H_N - (2B/N \cdot (\text{Trunc}(R/3) + P + 2_R)) \text{modulo } 2B)/H_N$ In this equation, given N cells numbered 0 to N−1 and a $2_v$ value for each cell, $2_0$ is determined as an angle that will interdigitate the carriers for all of the cells in the circuit.

In the equations listed above:
$2_C$=carrier angle (in radians)
$2_{C0}$=carrier offset in carrier reference frame
$2_{CR}$=carrier reference angle (which may be an arbitrary constant value that is equal in all cells)
$2_0$=carrier offset in fundamental reference frame
$2_v$=difference between primary and secondary voltage angle (or, in an alternate embodiment, a phase relationship between the secondary voltage and a selected reference waveform, such as another secondary voltage)

$2_R$=starting carrier offset in fundamental reference frame for the entire drive unit $H_N$=fundamental to carrier frequency multiplier (any integer value)

$T_c$=carrier frequency (in radians per second)

$T_f$=fundamental frequency (in radians per second)

N=total number of cells per output phase

R=location of cell numbered from 0 to N−1

P=output phase which contains the cell (−2B/3 for A, 0 for B, and 2B/3 for C)

The $2_0$ value necessary to interdigitate the carriers may be calculated in many different ways, and the calculations may vary on a cell-by-cell basis. The carrier offset angle represents a fixed phase relationship between the carrier signal of a cell and the transformer secondary voltage provided to the cell. The calculations above represent one example, and the invention described herein is not limited to the above calculation. Any other method of calculating a carrier offset angle in a fundamental reference frame may be used. The example calculation requires a cell that can maintain a carrier synchronized to its secondary fundamental voltage at a desired angle relative to such a voltage, and a method of determining the difference between the primary voltage and each cell's secondary voltage. Any methods of calculation now or hereafter known may be used.

In the methods described herein, although a master clock may be used to determine an initial offset value, the master clock need not be used when performing synchronization, as the system has determined a set phase relationship for each carrier signal to the fundamental. Thus, a synchronizing clock signal is not required after the initial offset is determined.

The controller may then pass 418 the carrier offset angle to the appropriate cell with a phase angle offset with respect to the fundamental line voltage that results in the carrier signal being interdigitated with other carrier signals delivered to other cells. The carrier offset angle may be delivered to the cell as a synchronization signal that represents the phase angle relationship between the input voltage (i.e., the source or transformer primary voltage) and the actual secondary voltage in each cell. The synchronization signal may be part of the PWM carrier, or it may be delivered as a separate signal. The cell then synchronizes 420 its carrier signal to the secondary signal using the offset angle that it receives from the controller.

FIG. 5 illustrates how multiple carrier signals 510, 520, 530, etc. for multiple cells may be interdigitated with each other in a synchronized manner to a reference signal 550, as reflected to the primary windings of the source transformer Each cell may have its own reference signal, and the reference signals for each cell will be similar but not necessarily the same. The carrier signal in each cell will determine when a switching command occurs within that cell. As shown in FIG. 5, since each carrier signal is phase-shifted from the carrier signals from the other cells by a predetermined amount ($2_0$), the effect of the switching commands for each cell as reflected to the primary of the transformer will be spaced out over a period of time based on the $2_0$ value, or the spacing of the interdigitation. Thus, instead of all cells effectively implementing the same switching operation at the same time (which would cause a large harmonic disturbance), the effect of the switching operations at the primary of the transformer occur in rapid sequence based on the substantially even offset of the carrier signals. In addition, since the effective frequency of the carrier signals seen at the source transformer primary is relatively high (such as on the order of about $f_c \cdot N$), the harmonics may be further smoothed, as the impedance of the source transformer itself may filter our some or all of the high-frequency harmonics.

In some embodiments, multiple drives may be connected to a single transformer or a group of transformers sharing a common primary voltage. In such a situation, multiple drives may have their carrier signals interdigitated by adjusting the drive carrier offset angle ($2_R$) for each drive and setting each drive to the same carrier frequency.

Figure 6:
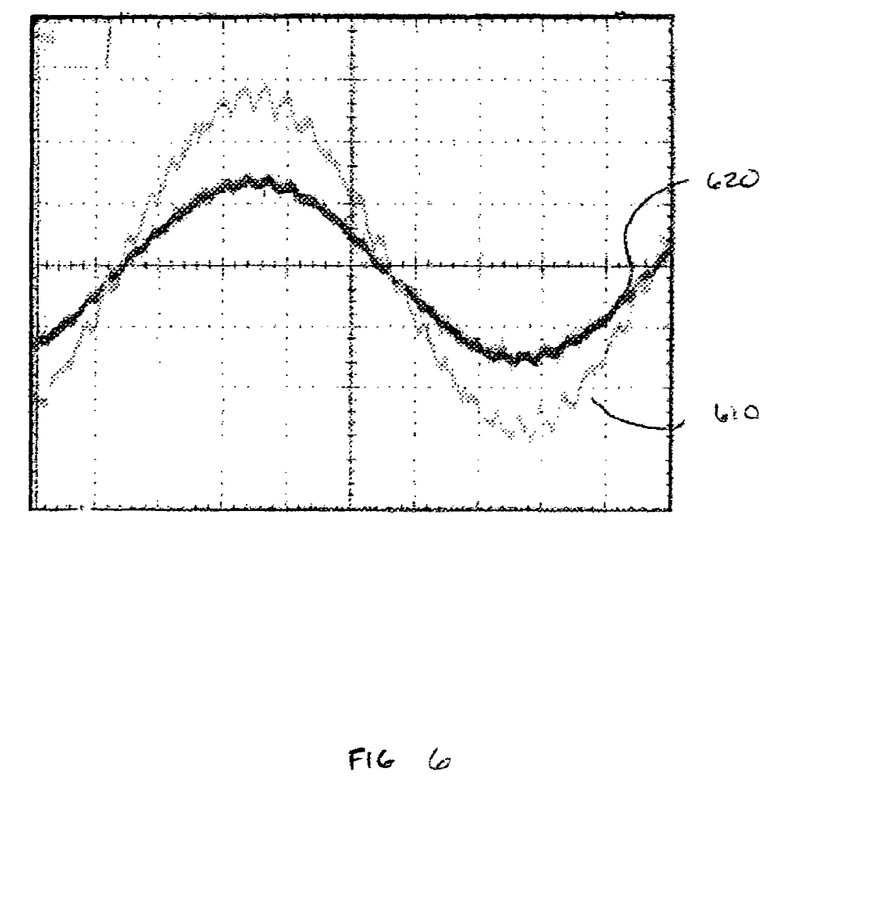
FIG. 6 illustrates an exemplary trace of one phase of voltage and current delivered to a load.
Figure 7:
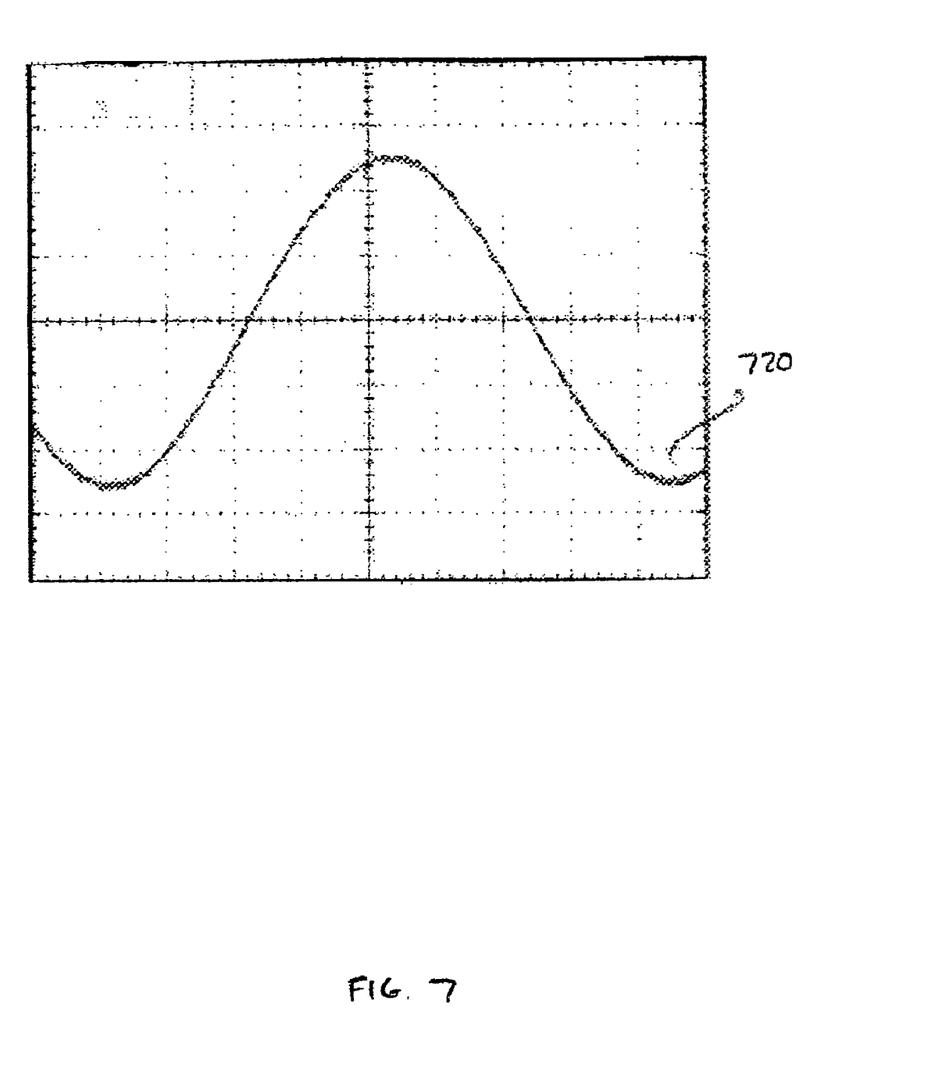
FIG. 7 illustrates an exemplary current trace after the application of carrier synchronization methods.
Figure 8:
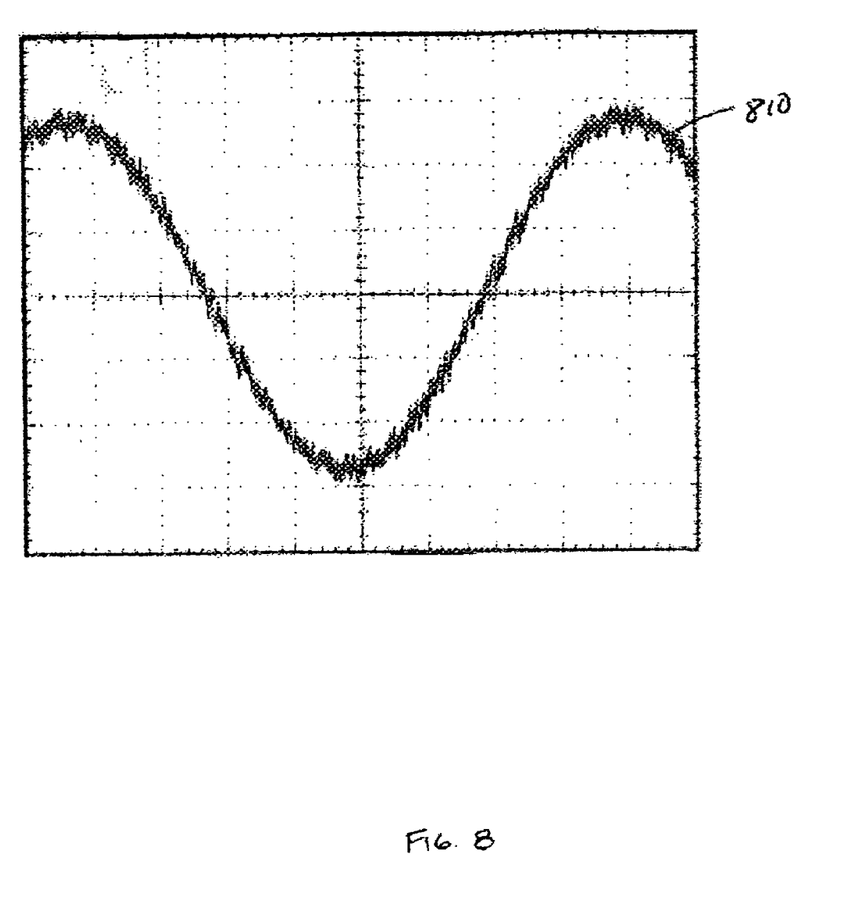
FIG. 8 illustrates an exemplary voltage trace after the application of carrier synchronization methods.

In the embodiments provided herein, the interdigitation of the carrier signals may increase the frequency of the voltage harmonics and reduce the peaks of the voltage harmonics, which in turn may reduce current harmonics. For example, FIG. 6 illustrates an exemplary trace of one phase of voltage 610 and current 620 delivered to a load from a drive having twenty-one regenerative power cells using a source transformer rated for 7200 volts primary and 600 volts secondary. In the data shown in FIG. 6, although the source transformer had phase-shifted secondaries, carrier de-synchronization (i.e., the shifting of the carrier signals by an offset) was not performed, and both voltage and current harmonics are obvious in the traces. FIGS. 7 and 8 show traces of current 720 and voltage 810 on the same circuit after the application of carrier synchronization methods such as those described herein.

In some embodiments, interdigitation of the switching events may occur using known methods other than adjustment of a carrier signal. For example, if space vector modulation is used instead of sine triangle methods as described herein, the method still may include interdigitating the effective timing of switching events as reflected to the primary.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application

What is claimed is:

1. A method of controlling a power delivery system, comprising:

operating a system comprising a plurality of power cells that are electrically connected to a first transformer comprising one or more primary windings and a plurality of secondary windings such that each cell is electrically connected to one of the secondary windings and a plurality of the secondary windings are phase-shifted with respect to the primary windings, wherein each cell includes a plurality of switching devices; and controlling the timing of activation of the switching devices within each cell so that an effective frequency of the activation for all of the cells as reflected to the primary is at least three times greater than the switching frequency of any individual cell.

2. The method of claim 1, wherein the controlling does not require the use of a synchronizing clock signal.

3. The method of claim 1, wherein the controlling comprises:

determining a carrier offset angle;

passing the carrier offset angle to the first power cell; and synchronizing, by the first power cell, a carrier signal to the first secondary voltage based on the carrier offset angle.

4. The method of claim 3, further comprising, synchronizing, by each additional cell in the system, an additional carrier signal to a secondary voltage for each additional cell.

5. The method of claim 3, wherein the carrier signals for each cell are interdigitated so that they are distributed substantially evenly when reflected toward the primary windings of the source transformer.

6. The method of claim 3, wherein the carrier signal also controls the timing of implementation of commands that control the switching devices.

7. The method of claim 6, wherein the switching devices are part of an AC-to-DC converter portion of the cell.

8. The method of claim 6, wherein when a plurality of the cells determine that switching commands must be implemented, the carrier offset angle for each cell ensures that the commands are effectively interdigitated as reflected to the primary of the transformer.

9. The method of claim 8, wherein:
a command is implemented by the first power cell at a frequency substantially equal to a multiple of a fundamental frequency.

10. The method of claim 3, wherein the carrier offset angle represents a phase relationship between the carrier signal of the first cell and the first secondary voltage.

11. The method of claim 3, further comprising:
operating a second system comprising a second transformer and a second plurality of power cells, wherein:
the second transformer comprises one or more primary windings and a plurality of secondary windings;
the primary windings of the second transformer are electrically connected to the primary windings of the source transformer at a common point; and
each power cell in the second system generates a carrier signal;
wherein the carrier signals for each cell in the second system are interdigitated so that they are distributed substantially evenly when reflected toward the primary windings of the secondary transformer.

12. A method of operating a power delivery system, comprising:
operating a system comprising a plurality of power cells that are electrically connected to a first transformer comprising one or more primary windings and a plurality of secondary windings such that each cell is electrically connected to one of the secondary windings and a plurality of the secondary windings are phase-shifted with respect to the primary windings, wherein each cell includes a plurality of switching devices;
wherein a first secondary winding is electrically connected to deliver power to a first power cell;
determining a carrier offset angle;
passing the first carrier offset angle to the first power cell;
synchronizing, by the first power cell, a carrier signal to the first secondary voltage based on the first carrier offset angle; and
for a second cell that is connected to a second secondary winding of the source transformer, wherein the second secondary winding has a voltage that is phase-shifted with respect the voltage of the first secondary winding, synchronizing a second carrier signal to the second secondary voltage using a second carrier offset angle.

13. The method of claim 12, wherein the carrier signals for each cell that is electrically connected to the source transformer are interdigitated so that they are distributed substantially evenly when reflected toward the primary windings of the source transformer.

14. The method of claim 12, wherein:
the carrier signal for each cell also controls the timing of implementation of commands that control the switching devices; and
the synchronizing controls the timing of activation of the switching devices within each cell so that an effective frequency of the activation for all of the cells as reflected to the primary is at least three times greater than the switching frequency of any individual cell.

15. The method of claim 14, wherein the commands control switching devices that are part of an AC-to-DC converter portion of each cell.

16. The method of claim 14, wherein when a plurality of the cells determine that switching commands must be implemented, the commands are effectively interdigitated as reflected to the primary of the transformer.

17. The method of claim 14, wherein:
a command is implemented by the first power cell at a frequency substantially equal to a multiple of a fundamental frequency.

18. The method of claim 12, wherein the carrier offset angle represents a phase relationship between the carrier signal of the first cell and the first secondary voltage.

19. A method of operating a power delivery system, comprising:
operating a system comprising a plurality of power cells that are electrically connected to a multi-winding machine comprising one or more primary windings and a plurality of secondary windings such that each cell is electrically connected to one of the secondary windings and a plurality of the secondary windings are phase-shifted with respect to the primary windings;
determining, for each cell in a set of the power cells, a carrier offset angle;
synchronizing, by the each cell in the set, a carrier signal to the secondary voltage for the cell based on the carrier offset angle determined for the cell; and
wherein the carrier signal for each cell controls the timing of operation of switching devices within the cell.

20. The method of claim 19 wherein a switching frequency for all of the cells is at least three times greater than a switching frequency for any individual cell's carrier signal.

21. A power delivery system, comprising:
a plurality of power cells that are electrically connected to a first transformer comprising one or more primary windings and a plurality of secondary windings such that each cell is electrically connected to one of the secondary windings and a plurality of the secondary windings are phase-shifted with respect to the primary windings; and
a plurality of switching devices included within each cell is timed, wherein timing of activation of the switching devices within each cell so that an effective frequency of the activation for all of the cells as reflected to the primary is at least three times greater than the switching frequency of any individual cell.

22. The system of claim 21, wherein a synchronizing clock signal is not required for activation of the switching devices.

23. The system of claim 21, wherein the effective frequency is determined by a carrier offset angle, passing the carrier offset angle to the first power cell, and synchronizing, by the first power cell, a carrier signal to the first secondary voltage based on the carrier offset angle.

24. The system of claim 21, wherein each cell includes a carrier signal interdigitated so that they are distributed substantially evenly when reflected toward the primary windings of the source transformer.

* * * * *